United States Patent
Lee

(10) Patent No.: US 7,697,597 B2
(45) Date of Patent: Apr. 13, 2010

(54) APPARATUS FOR CALCULATING DECISION PARAMETERS IN AN IMT-2000 SYSTEM

(75) Inventor: Jae-Yong Lee, Ichon-shi (KR)

(73) Assignee: Pantech & Curitel Communications, Inc., Seoul (KR)

( * ) Notice: Subject to any disclaimer, the term of this patent is extended or adjusted under 35 U.S.C. 154(b) by 1080 days.

(21) Appl. No.: 11/148,843

(22) Filed: Jun. 9, 2005

(65) Prior Publication Data

US 2005/0220177 A1 Oct. 6, 2005

Related U.S. Application Data

(62) Division of application No. 09/748,483, filed on Dec. 27, 2000, now Pat. No. 6,912,245.

(30) Foreign Application Priority Data

Dec. 27, 1999 (KR) ................ 1999-62990

(51) Int. Cl.
*H04B 1/69* (2006.01)
*H04B 1/707* (2006.01)
*H04B 1/713* (2006.01)

(52) U.S. Cl. ............ 375/150; 375/142; 375/343; 708/422

(58) Field of Classification Search ............ 375/142, 375/144, 145, 148–150, 152, 343, 367; 708/422; 370/342, 350
See application file for complete search history.

(56) References Cited

U.S. PATENT DOCUMENTS

| | | | | |
|---|---|---|---|---|
| 5,218,562 A | 6/1993 | Basehore et al. | ............ | 708/422 |
| 5,675,608 A | 10/1997 | Kim et al. | ............ | 375/145 |
| 5,724,046 A * | 3/1998 | Martin et al. | ............ | 342/357.12 |
| 5,724,384 A | 3/1998 | Kim et al. | ............ | 375/149 |
| 5,729,571 A | 3/1998 | Park et al. | ............ | 375/149 |
| 5,898,665 A * | 4/1999 | Sawahashi et al. | ............ | 370/342 |
| 5,909,462 A | 6/1999 | Kamerman et al. | ............ | 375/206 |
| 5,970,084 A | 10/1999 | Honda | ............ | 375/147 |
| 6,115,411 A | 9/2000 | Van Driest | ............ | 375/200 |
| 6,208,291 B1 | 3/2001 | Krasner | ............ | 342/357.12 |
| 6,628,700 B1 * | 9/2003 | Miura | ............ | 375/148 |
| 6,643,320 B1 | 11/2003 | Wilcox et al. | ............ | 375/150 |

FOREIGN PATENT DOCUMENTS

| | | |
|---|---|---|
| JP | 07297805 | 11/1995 |
| JP | 09148980 | 6/1997 |
| JP | 11068618 | 3/1999 |
| WO | 9912273 | 3/1999 |

* cited by examiner

*Primary Examiner*—Phuong Phu
(74) *Attorney, Agent, or Firm*—H.C. Park & Associates, PLC

(57) ABSTRACT

An apparatus for calculating decision parameters in an IMT-2000 system includes a correlation value calculation unit having a number of correlation value calculators, each of which calculates a correlation value between selected information that is selected at the mini-slot selection unit and one of capable input signals. To selectively operate the correlation value calculators, a ranking determination unit is included to receive and rank the correlation values and to selectively operating the correlation value calculators according to the rank of the correlation values. Accordingly, the power consumption of the correlation value calculators is reduced. And, the decision parameter is selected from the decision parameters previously selected during the divided monitoring section, thereby enabling high-speed cell search.

3 Claims, 4 Drawing Sheets

APPARATUS FOR CALCULATING DECISION PARAMETERS IN AN IMT-2000 SYSTEM

CROSS REFERENCE TO RELATED APPLICATIONS

This application is a divisional application of U.S. patent application Ser. No. 09/748,483, filed on Dec. 27, 2000, now issued as U.S. Pat. No. 6,912,245, which claims priority from and the benefit of Korean Patent Application No. 1999-62990, filed on Dec. 27, 1999, all of which are hereby incorporated by reference for all purposes as if fully set forth herein.

FIELD OF THE INVENTION

The present invention relates to an apparatus for calculating decision parameters in an IMT-2000 system, and, more particularly, to an apparatus for calculating decision parameters with low power consumption and a high-speed cell search.

DESCRIPTION OF THE PRIOR ART

Generally, at a code position modulation (CPM) type of W-CDMA system, a position of a synchronization signal (a synchronization code) which is used to perform a base station discrimination, a mobile station synchronization and a high-speed cell search, is differently modulated according to each of base stations and transferred to each of receivers.

The synchronization code of a forward directional synchronization channel adapted by the CPM type consists of one binary code having a length of 256 chips. One synchronization code is transmitted according to each of slots. Wherein, one frame is a length of 2560 chips and one frame has 16 slots. Each of the slots is divided into a number of mini-slots. The length of the mini-slot is represented by $\delta$ that is a positive integer and a changeable parameter according to a need of system operation.

In addition, the position of the synchronization code inserted to each of the mini-slots is given to a value coinciding with each code element of a time hopping code corresponding to a long code group of a current base station. The length of the time hopping code used herein is 16 being equal to the length of slot number of each frame. The magnitude of alphabet M of each time hopping code is equal to or less than the number of mini-slots in a slot.

On the other hand, at a transmitting unit, the position of the synchronization code adapted by the CPM type is modulated and transmitted. A receiving unit (a CPM receiver) receives the modulated and transmitted position and detects base station group information.

FIG. 1 shows a schematic diagram of a high-speed cell searching process of a prior art of a CPM type of W-CDMA system.

At first step, a start point of a mini-slot is detected by using a synchronization channel match filter.

And then, at second step, both long code group information and a start point of 10 ms frame are detected by using the output value of the match filter at each mini-slot clock position (i.e., each $\delta$ chip) after the start point of the mini-slot.

Finally, the long code start point information is used to determine the type of the long code.

The detailed description of the second step is as follows.

For example, in case that the number of the long code group used at the system is 2 and the number of each of the slots is 4, a decision parameter is calculated as follows.

Long code group number=2
Slot number per frame=4
Mini-slot number=Skip code alphabet magnitude=5
Skip code for group 1=(1 3 3 4)
Skip code for group 2=(4 2 0 1)
Total code/shift collection=(1 3 3 4)(4 1 3 3)(3 4 1 3)(3 3 4 1)(4 0 2 1)(1 4 0 2)(2 1 4 0)(0 2 1 4)
Time shift (slots)=0 1 2 3

As shown in above example, a CPM receiver calculates decision parameters for 8 (2×4) code group shift collections based on the slot start point of the matched filter. The decision parameters are correlation values between an input code and all of group information codes. The largest decision parameter is a group information code having a largest capability. The group information code is used to calculate a start point of the frame.

For one mini-slot, L (Code group number×Slot number per frame) decision parameters are calculated. The mini-slot number N is determined according to a required system performance and a used circumstance.

FIG. 2 shows a block diagram of a prior art of a CPM receiver.

As shown in FIG. 2, a mini-slot selection unit 10 selects a suitable mini-slot position at an inputted synchronization channel. Each of the selected suitable mini-slot positions is provided to each of decision parameter calculators 21, 22 and 20+N contained at a decision parameter calculation unit 20 through each of lines L2, L4 and L6.

Each of the decision parameter calculators 21, 22 and 22+N calculates a correlation value between each input and all of the group information codes provided from line L8. Each output from each of the calculators 21, 22 and 22+N is provided to a decision parameter selection unit 30.

The decision parameter selection unit 30 selects required information among the inputted decision parameters.

In general, the required information selected at the decision parameter selection unit 30 is comprised of a set of several decision parameters having a largest value. At this time, the decision parameter calculation unit 20 continues a calculation process that does not effect the final decision parameter selection determination.

Since, however, the decision parameter calculation unit of the prior CPM receiver continues the calculation process after the decision parameter selection unit selects the required information, a consumption power of the receiver is increased.

SUMMARY OF THE INVENTION

It is, therefore, a primary object of the invention to provide to an apparatus for calculating decision parameters with low power consumption and a high-speed cell search.

To achieve the above object, in one embodiment of the present invention, an apparatus for calculating decision parameters in an IMT-2000 system, the IMT-2000 system having a mini-slot selection unit for selecting a mini-slot position wherein a decision parameter is selected and a decision parameter selection unit for selecting one decision parameter from the calculated decision parameters, said apparatus comprises: a correlation value calculation unit having a number of correlation value calculators, each of which calculates a correlation value between selected information that is selected at the mini-slot selection unit and one of capable input signals; and a correlation circuit control unit having a number of correlation circuit controllers each of which receives a correlation value from a corresponding one of the correlation value calculators and compares the received correlation value to a predetermined threshold value during a predetermined monitoring section, and controlling the operation of each of the correlation value calculators by using each of the comparing results.

Wherein, the predetermined monitoring section is obtained by dividing a total monitoring section of each of the correlation value calculators, and said threshold value is determined in order to determine whether one of the correlation value calculators operates or not during the total monitoring section.

To achieve the above object, in another embodiment of the present invention, an apparatus for calculating decision parameters in an IMT-2000 system, the IMT-2000 system having a mini-slot selection unit for selecting a mini-slot position wherein a decision parameter is selected and a decision parameter selection unit for selecting one decision parameter from the calculated decision parameters, said apparatus comprises: a correlation value calculation unit having a number of correlation value calculators, each of which calculates a correlation value between selected information that is selected at the mini-slot selection unit and one of capable input signals; and a ranking determination unit receiving each of correlation values provided from each of the correlation value calculators during a predetermined monitoring section, ranking the correlation values and selectively operating the correlation value calculators according to the rank of the correlation values.

Wherein, the predetermined monitoring section is obtained by dividing a total monitoring section of each of the correlation value calculators, and wherein said ranking determination unit operates a predetermined number of high ranked correlation value calculators and stops the operation of the other correlation value calculators that are not high ranked during a remaining total monitoring section.

The advantages of the invention are numerous. One of advantage of the invention is that a number of correlation value calculators that do not effect the decision parameter selection are not operated during the remaining monitoring section by using the threshold comparison technique and the correlation value ranking technique to reduce the power consumption of the correlation value calculators.

Another advantage of the invention is that the decision parameter is selected from the decision parameters previously selected during the divided monitoring section, thereby enabling high-speed cell search.

These and other features of the present invention are more fully shown and described in the drawings and detailed description of this invention. It is to be understood, however, that the description and drawings are for the purpose of illustration and should not be read in a manner that would unduly limit the scope of this invention.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE INVENTION

Preferred embodiments of the present invention will now be described in detail, with reference to the accompanying drawings.

The decision parameter calculation unit in accordance with the present invention utilizes a threshold value technique or a ranking technique.

Embodiment 1

Figure 3:
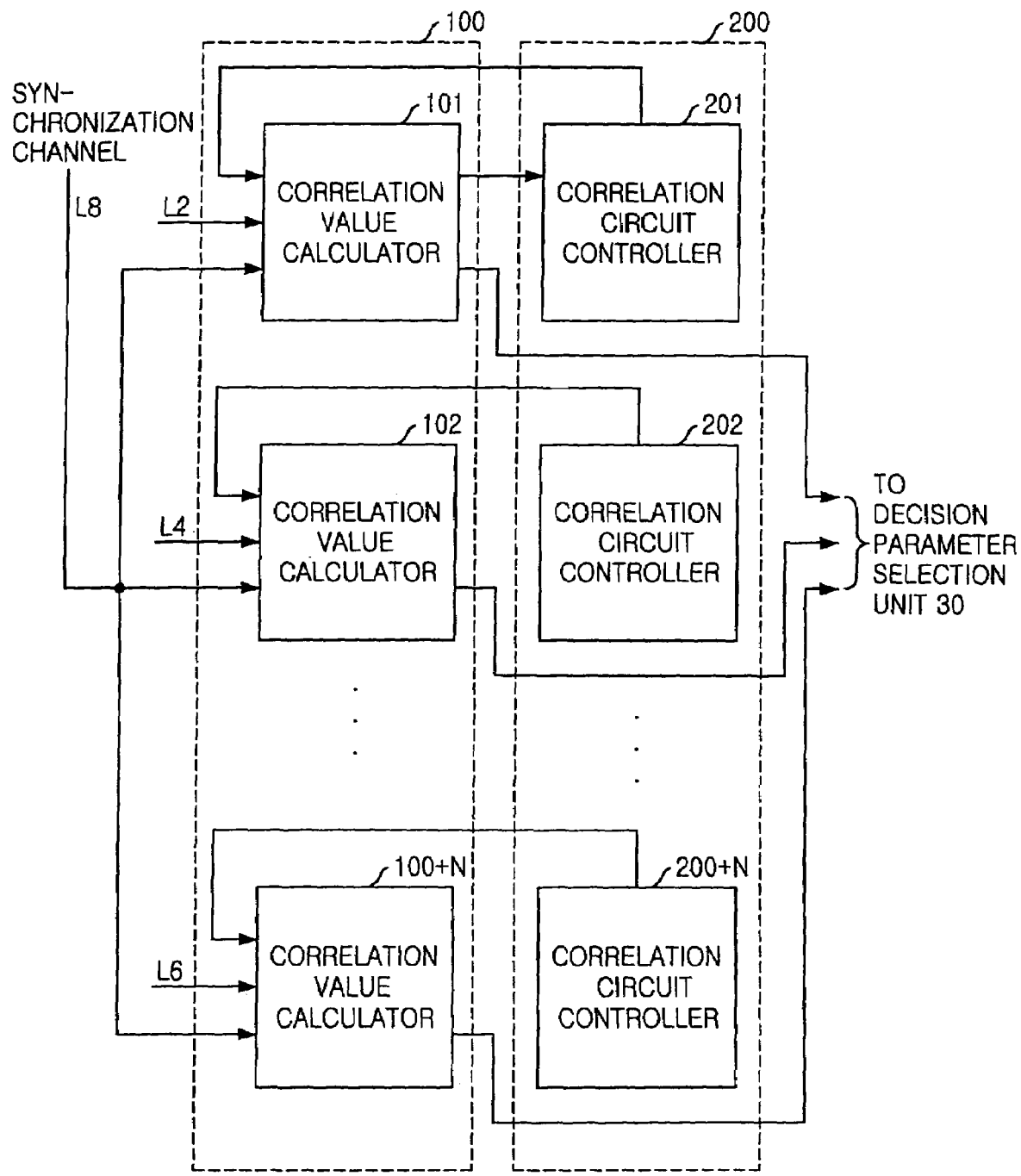
FIG. 3 describes a block diagram of a decision parameter calculation apparatus of IMT2000 system in accordance with a first embodiment of the present invention.

FIG. 3 describes a block diagram of a decision parameter calculation unit of IMT2000 system in accordance with a first embodiment of the present invention.

As shown in FIG. 3, a reference numeral 100 denotes a correlation value calculation unit having a number of correlation value calculators 101, 102 and 100+N. Each of the correlation value calculators 101, 102 and 100+N calculates a correlation value between selected information that is selected at the mini-slot selection unit (reference numeral 10 of FIG. 2) and one of capable input signals.

Also, a reference numeral 200 denotes a correlation circuit control unit 200 having a number of correlation circuit controllers 201, 202 and 200+N. Each of the correlation circuit controllers 201, 202 and 200+N receives a correlation value from a corresponding one of correlation value calculators 101, 102 and 100+N and compares the received correlation value to a predetermined threshold value during a predetermined monitoring section. By using each of the comparing results, each of the correlation circuit controllers 201, 202 and 200+N controls the operation of a corresponding correlation value calculator.

The operation of the first embodiment is as follows.

Figure 1:
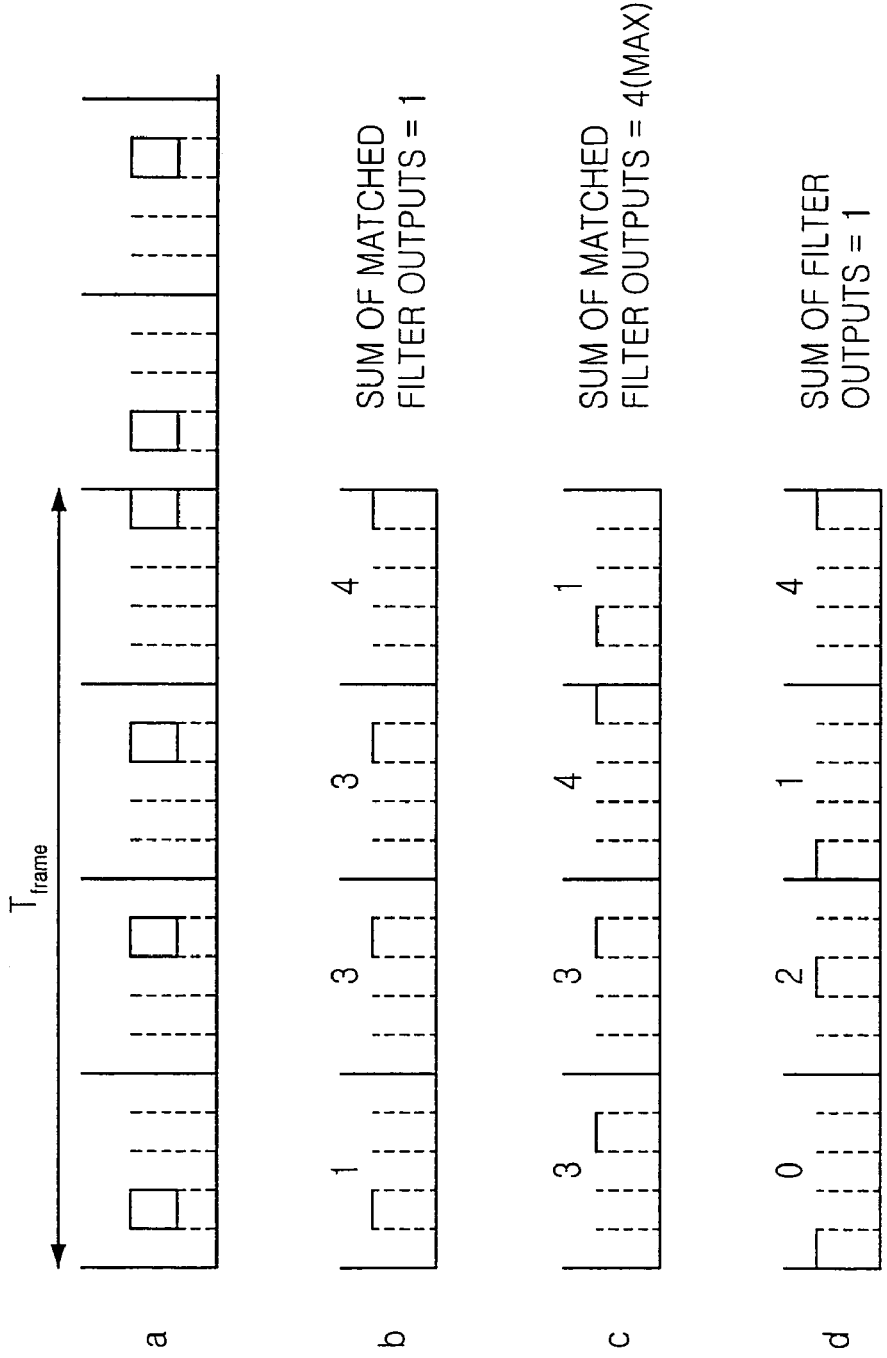
FIG. 1 is a schematic diagram of a high-speed cell searching process of a prior art of a CPM type of IMT2000 system.
Figure 2:
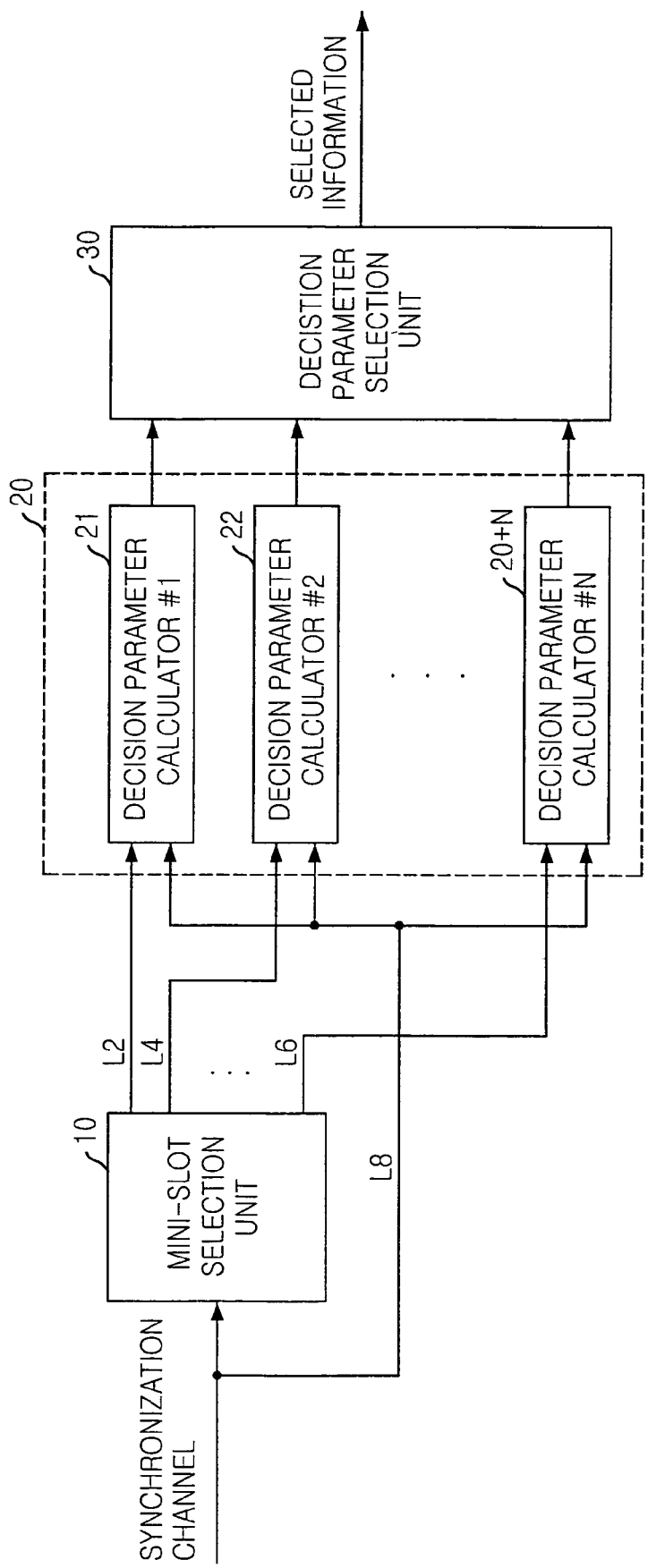
FIG. 2 shows a block diagram of a prior art of a CPM receiver of IMT2000 system.

Firstly, each output from the mini-slot selection unit 10 of FIG. 2 is provided to a corresponding one of correlation value calculators 101, 102 and 100+N contained at the correlation value calculation unit 100.

And then, each of the correlation value calculators 101, 102 and 100+N calculates the correlation value between the inputted value and one of the capable input signals to provide the calculated correlation value to a corresponding one of the correlation circuit controllers 201, 202 and 200+N contained at the correlation circuit control unit 200.

Each of the correlation circuit controllers 201, 202 and 200+N contained at the correlation circuit control unit 200 compares the predetermined threshold value (H1) to an inputted correlation value during a divided monitoring section (T1) that is divided from a prior monitoring section (T). The threshold value is a value by which the correlation value calculator is operated or not during the monitoring section (T).

In case that the inputted correlation value is larger than the threshold value (H1), a corresponding correlation calculator is operated during the monitoring section (T). In case that the inputted correlation value is not larger than the threshold value (H1) during the divided monitoring section (T1), a corresponding correlation calculator is not operated during a remaining section, i.e., the section between the T1 and T.

For example, a correlation circuit controller 201 compares a correlation value from the correlation value calculator 101 to a predetermined threshold value (H1) during a divided monitoring section (T1). In case that the correlation value is larger than the threshold value (H1), the correlation circuit controller 201 enables the correlation value calculator 101 to be operated during the monitoring section (T). In case that the correlation value is not larger than the threshold value (H1), the correlation circuit controller 201 enables the correlation value calculator 101 to be not operated during a remaining section, i.e., the section between T1 and monitoring section (T).

Similarly, each of the remaining correlation circuit controllers 202 and 2000+N performs the same operation as the correlation circuit controller 201.

Since, therefore, each of the correlation value calculators 101, 102 and 100+N is selectively operated or not according to the threshold value, only the correlation value calculators having a condition that a decision parameter is larger than the threshold value, operates during the monitoring section (T) and other correlation value calculators having a condition that a decision parameter is not larger than the threshold value, does not operate after the divided monitoring section (T1). Accordingly, the power is not consumed during the remaining monitoring section between T1 and T to reduce the power consumption.

Embodiment 2

Figure 4:
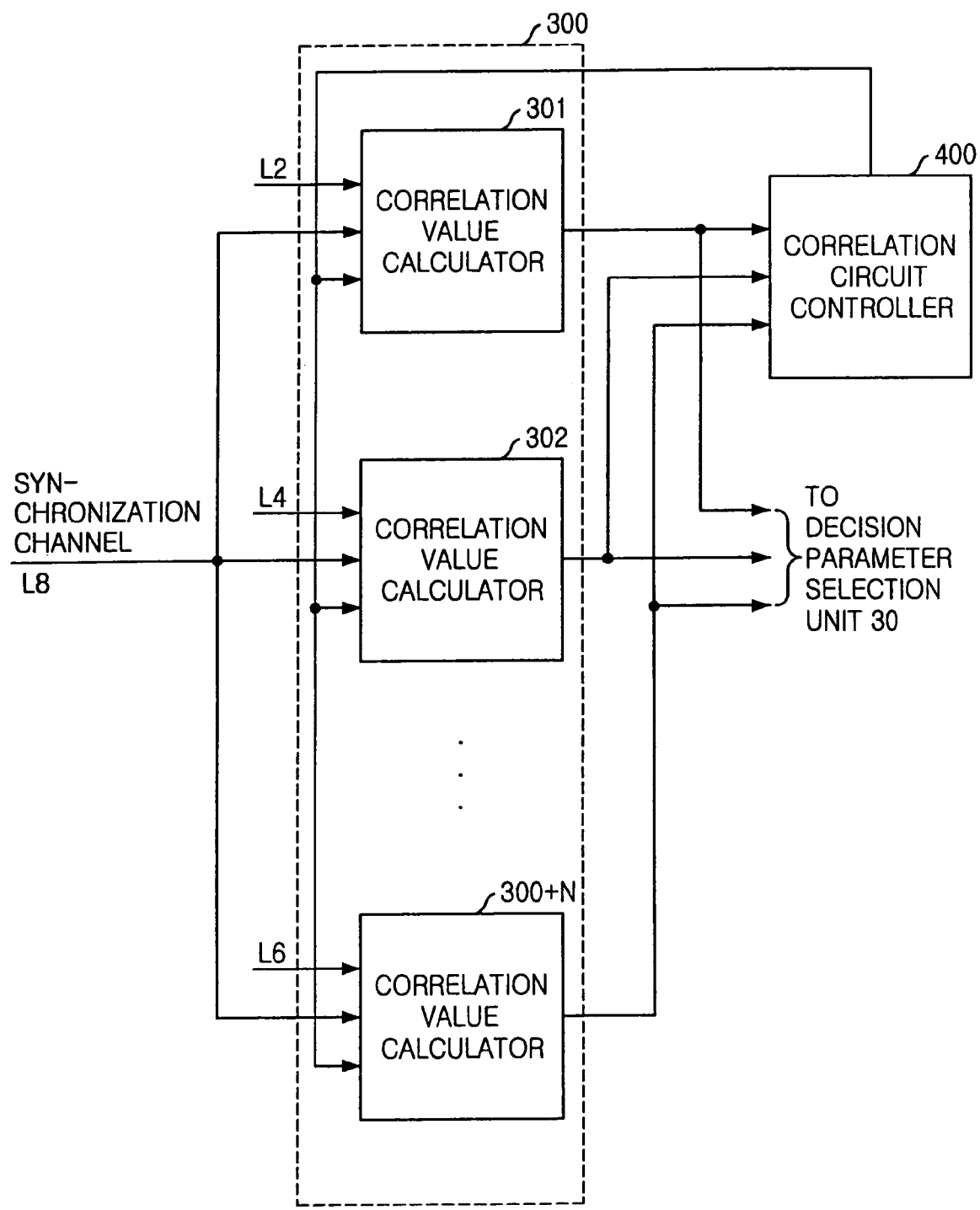
FIG. 4 illustrates a block diagram of a decision parameter calculation apparatus of IMT2000 system in accordance with a second embodiment of the present invention.

FIG. 4 illustrates a block diagram of a decision parameter calculation apparatus in accordance with a second embodiment of the present invention.

As shown in FIG. 4, a reference numeral 300 denotes a correlation value calculation unit having a number of correlation value calculators 301, 302 and 300+N. Each of the correlation value calculators 301, 302 and 300+N calculates a correlation value between selected information that is selected at the mini-slot selection unit (reference numeral 10 of FIG. 2) and one of capable input signals.

Also, a reference numeral 400 denotes a ranking determination unit that receives each of correlation values provided from each of the correlation value calculators 301, 302 and 300+N a, ranks the correlation values and selectively operates the correlation value calculators 301, 302 and 300+N according to the rank of the correlation values.

The operation of the second embodiment is as follows.

Firstly, each output from the mini-slot selection unit 10 of FIG. 2 is provided to a corresponding one of correlation value calculators 301, 302 and 300+N contained at the correlation value calculation unit 300.

And then, each of the correlation value calculators 301, 302 and 300+N calculates the correlation value between the inputted value and one of the capable input signals to provide the calculated correlation value to the ranking determination unit 400 and the decision parameter selection unit 30 of FIG. 2.

The ranking determination unit 400 ranks the inputted correlation values, each of which is calculated during a divided monitoring section T1, and operates I number of correlation value calculators that are high ranked. The other correlation value calculators that are not high ranked, are not operated.

For example, in case that there are five correlation value calculators #1, #2, #3, #4 and #5, the ranking is in a sequence #2, #3, #1, #5, #4 during the divided ranking section (T1), and the number of the correlation value calculators to be operated is 3, the ranking determination unit 400 operates three correlation value calculators #2, #3 and #1 during the monitoring section (T) and does not operate the remaining correlation value calculators #5 and #4 during the monitoring section (T).

Since, therefore, each of the correlation values is detected and ranked during the divided monitoring section (T1) and only a predetermined number of high ranked correlation value calculators is operated during a remaining monitoring section, the power consumption can be reduced.

The advantages of the invention are numerous. Different embodiments or implementations may yield one or more of the following advantages. One of advantage of the invention is that a number of correlation value calculators that do not effect the decision parameter selection are not operated during the remaining monitoring section by using the threshold comparison technique and the correlation value ranking technique to reduce the power consumption of the correlation value calculators.

Another advantage of the invention is that the decision parameter is selected from the decision parameters previously selected during the divided monitoring section, thereby enabling high-speed cell search.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for calculating decision parameters in an IMT-2000 system, the IMT-2000 system having a min-slot selection unit to select a min-slot position, wherein a decision parameter is selected, and a decision parameter selection unit to select one decision parameter from the calculated decision parameters, said apparatus comprising:
    a correlation value calculation unit having a first number of correlation value calculators, each of which calculates a correlation value between selected information that is selected at the mini-slot selection unit and one of capable input signals; and
    a ranking determination unit to receive each of correlation values provided from each of the correlation value calculators during a predetermined monitoring section, to rank the correlation values, and to selectively operate the correlation value calculators according to the rank of the correlation values,
    wherein only a predetermined number of correlation value calculators are selectively operated according to the rank of the correlation values, the predetermined number being less than the first number of correlation value calculators.

2. An apparatus as recited in claim 1, wherein the predetermined monitoring section is obtained by dividing a total monitoring section of each of the correlation value calculators.

3. An apparatus as recited in claim 1, wherein said ranking determination unit operates a predetermined number of high ranked correlation value calculators and stops the operation of the other correlation value calculators that are not ranked during a remaining total monitoring section.

* * * * *